(12) United States Patent
Graves

(10) Patent No.: US 10,453,446 B1
(45) Date of Patent: *Oct. 22, 2019

(54) SYSTEM AND METHOD FOR SPEECH RECOGNITION USING DEEP RECURRENT NEURAL NETWORKS

(71) Applicant: Google LLC, Mountain View, CA (US)

(72) Inventor: Alexander B. Graves, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,078

(22) Filed: Feb. 4, 2019

Related U.S. Application Data

(63) Continuation of application No. 15/043,341, filed on Feb. 12, 2016, now Pat. No. 10,199,038, which is a continuation of application No. 14/090,761, filed on Nov. 26, 2013, now Pat. No. 9,263,036.

(60) Provisional application No. 61/731,047, filed on Nov. 29, 2012.

(51) Int. Cl.
*G06K 9/00* (2006.01)
*G10L 15/16* (2006.01)
*G06N 3/08* (2006.01)
*G06N 3/04* (2006.01)

(52) U.S. Cl.
CPC ............ *G10L 15/16* (2013.01); *G06N 3/0445* (2013.01); *G06N 3/08* (2013.01)

(58) Field of Classification Search
CPC ......... G06N 3/0445; G06N 3/08; G10L 15/16
USPC ........................................................ 382/100
See application file for complete search history.

(56) References Cited

U.S. PATENT DOCUMENTS 9,141,916 B1 * 9/2015 Corrado ............... G06N 3/0454

OTHER PUBLICATIONS

Eyben, et al., "From Speech to Letters—Using a Novel Neural Network Architecture for Grapheme Based ASR," Proc. Automatic Speech Recognition and Understanding Workshop (ASRU), IEEE, pp. 376-380, Merano, Italy, 2009.
Graves, et al., "Connectionist Temporal Classifications: Labelling Unsegmented Sequence Data with Recurrent Neural Networks," Proceeding ICML '06 Proceedings of the 23rd International Conference on Machine Learning, pp. 369-376.
Monner and Reggia, "A Generalized LSTM-like Training Algorithm for Second-order Recurrent Neural Networks," Neural Networks, 2010, pp. 1-35.
Schuster, "Bi-directional Recurrent Neural Networks for Speech Recognition," Technical report, 1996, 2 pages.
Schuster and Paliwal, "Bidirectional Recurrent Neural Networks," IEEE Transactions on Signal Processing, 1997, 45(11):2673-2681.
Vinyals, et al., "Revisiting Recurrent Neural Networks for Robust ASR," IEEE International Conference on Acoustics, Speech, and Signal Processing (ICASSP), 2012, pp. 4085-4088.
Schmidhuber, "Recurrent Neural Networks," 2011 [retrieved on Jun. 10, 2013]. Retrieved from the internet: URL<http://www.idsia.ch/~juergen/rnn.html>, 8 pages.

(Continued)

*Primary Examiner* — Charlotte M Baker
(74) *Attorney, Agent, or Firm* — Fish & Richardson P.C.

(57) ABSTRACT

Deep recurrent neural networks applied to speech recognition. The deep recurrent neural networks (RNNs) are preferably implemented by stacked long short-term memory bidirectional RNNs. The RNNs are trained using end-to-end training with suitable regularisation.

20 Claims, 4 Drawing Sheets

(56) References Cited

OTHER PUBLICATIONS

Schmidhuber et al., "Book on Recurrent Neural Networks," Jan. 2011 [retrieved on Jun. 10, 2013]. Retrieved from the internet: URL<http://www.idsia.ch/~juergen/rnnbook.html>, 2 pages.
Graves et al., "A Novel Connectionist System for Unconstrained Handwriting Recognition," Journal IEEE Transactions on Pattern Analysis and Machine Intelligence, 31(5):855-868, May 2009.
Gomez et al., "Accelerated Neural Evolution through Cooperatively Coevolved Synapses," Journal of Machine Learning Research, 9:937-965, 2008.
'Daan Wierstra—Home Page' [online]. "Daan Wierstra," [retrieved on Jun. 10, 2013]. Retrieved from the internet: URL<http://www.idsia.ch/~daan/>, 2 pages.
"Matteo Gagliolo—CoMo Home Page," retrieved on Jun. 10, 2013. Retrieved from the internet: URL<http://www.idsia.ch/~matteo/>, 4 pages.
Koutnik et al., "Searching for Minimal Neural Networks in Fourier Space," [retrieved Jun. 10, 2013]. Retrieved from the internet: URL<http://www.idsia.ch/~juergen/agi10koutnik.pdf>, 6 pages.
Graves et al., "Offline Handwriting Recognition with Multidimensional Recurrent Neural Networks," Advances in Neural Information Processing Systems, 2009, 8 pages.
Bayer et al., "Evolving memory cell structures for sequence learning," ICANN 2009, Part II, LNCS 5769, 755-764, 2009.
Unkelbach et al., "An EM based training algorithm for recurrent neural networks," ICANN 2009, Part I, LNCS 5768, 964-974, 2009.
Graves et al., "Unconstrained Online Handwriting Recognition with Recurrent Neural Networks," Advances in Neural Information Processing Systems 20, 8 pages.
Rückstieß et al., "State-Dependent Exploration for Policy Gradient Methods," ECML PKDD 2008, Part II, LNAI 5212, 234-249, 2008.
Schaul et al., "A Scalable Neural Network Architecture for Board Games," Computational Intelligence and Games, 2008. CIG '08. IEEE Symposium on, Dec. 15-18, 2008, 357-364.
Sehnke et al., "Policy Gradients with Parameter-Based Exploration for Control," ICANN 2008, Part I, LNCS 5163, 387-396, 2008.
Wierstra et al., "Fitness Expectation Maximization," PPSN X, LNCS 5199, 337-346, 2008.
Wierstra et al., "Natural Evolution Strategies," IEEE, Jun. 1-6, 2008, 3381-3387.
Wierstra et al., "Policy Gradient Critics," ECML 2007, LNAI 4701, 466-477, 2007.
Liwicki et al., "A Novel Approach to On-Line Handwriting Recognition Based on Bidirectional Long Short-Term Memory Networks," Proceedings of the 9th International Conference on Document Analysis and Recognition, ICDAR 2007, 5 pages.
Fernandez et al., "An application of recurrent neural networks to discriminative keyword spotting," ICANN'07 Proceedings of the 17th international conference on Artificial neural networks, 220-229, 2007.
Graves et al., "Multi-Dimensional Recurrent Neural Networks," Feb. 11, 2013, 10 pages.
Forster et al., "RNN-based Learning of Compact Maps for Efficient Robot Localization," In proceeding of: ESANN 2007, 15th European Symposium on Artificial Neural Networks, Bruges, Belgium, Apr. 25-27, 2007, 6 pages.
Hochreiter et al., "LSTM Can Solve Hard Long Time Lag Problems," Advances in Neural Information Processing Systems 9, NIPS'9, 473-479, MIT Press, Cambridge MA, 1997 [retrieved on Jun. 10, 2013]. Retrieved from the internet: URL<http://www.idsia.ch/~juergen/nipslstm/nipslstm.html>, 1 page (abstract only).
Hochreiter et al., "Flat Minima," Neural Computation 9(1):1-42 (1997), [retrieved on Jun. 10, 2013]. Retrieved from the internet: URL<http://www.idsia.ch/~juergen/fm/>, 2 pages (abstract only).
"Fibonacci Web Design," 2010 [retrieved on Jun. 10, 2013]. Retrieved from the internet: URL<http://www.idsia.ch/~juergen/fibonacciwebdesign.html>, 1 page.

* cited by examiner

SYSTEM AND METHOD FOR SPEECH RECOGNITION USING DEEP RECURRENT NEURAL NETWORKS

CROSS-REFERENCE TO RELATED APPLICATIONS

This application is a continuation of U.S. application Ser. No. 15/043,341, filed on Feb. 12, 2016, which is a continuation of U.S. application Ser. No. 14/090,761, filed on Nov. 26, 2013 (now U.S. Pat. No. 9,263,036), which claims priority to U.S. Provisional Application No. 61/731,047, filed on Nov. 29, 2012. The disclosures of the prior applications are considered part of and are incorporated by reference in the disclosure of this application.

TECHNICAL FIELD

The present invention relates generally to speech recognition and more specifically to speech recognition provided by neural networks.

BACKGROUND

Neural networks have a long history in speech recognition, most notably as acoustic models for hybrid or tandem hidden Markov Model (HMM) systems. The recent introduction of deep networks to hybrid systems has improved results.

Recurrent neural network (RNN)-HMM hybrids have also been proposed but do not currently perform as well as deep feedforward networks. An alternative to HMM-RNN hybrids is to train RNNs directly for speech recognition. This approach exploits the larger state-space and richer dynamics of RNNs compared to HMMs, and makes it possible to use end-to-end training with no predefined alignment between the input and target sequences. Long Short-term Memory is an RNN architecture with an improved memory that has been successful at end-to-end cursive handwriting recognition. However it has so far made little impact on speech recognition.

It is an object of the following to obviate or mitigate at least one of the foregoing issues.

SUMMARY

In one aspect, a system for speech recognition comprising a deep recurrent neural network is provided.

DESRIPTION OF THE DRAWINGS

The features of the invention will become more apparent in the following detailed description in which reference is made to the appended drawings wherein.

DETAILED DESCRIPTION

Figure 1:
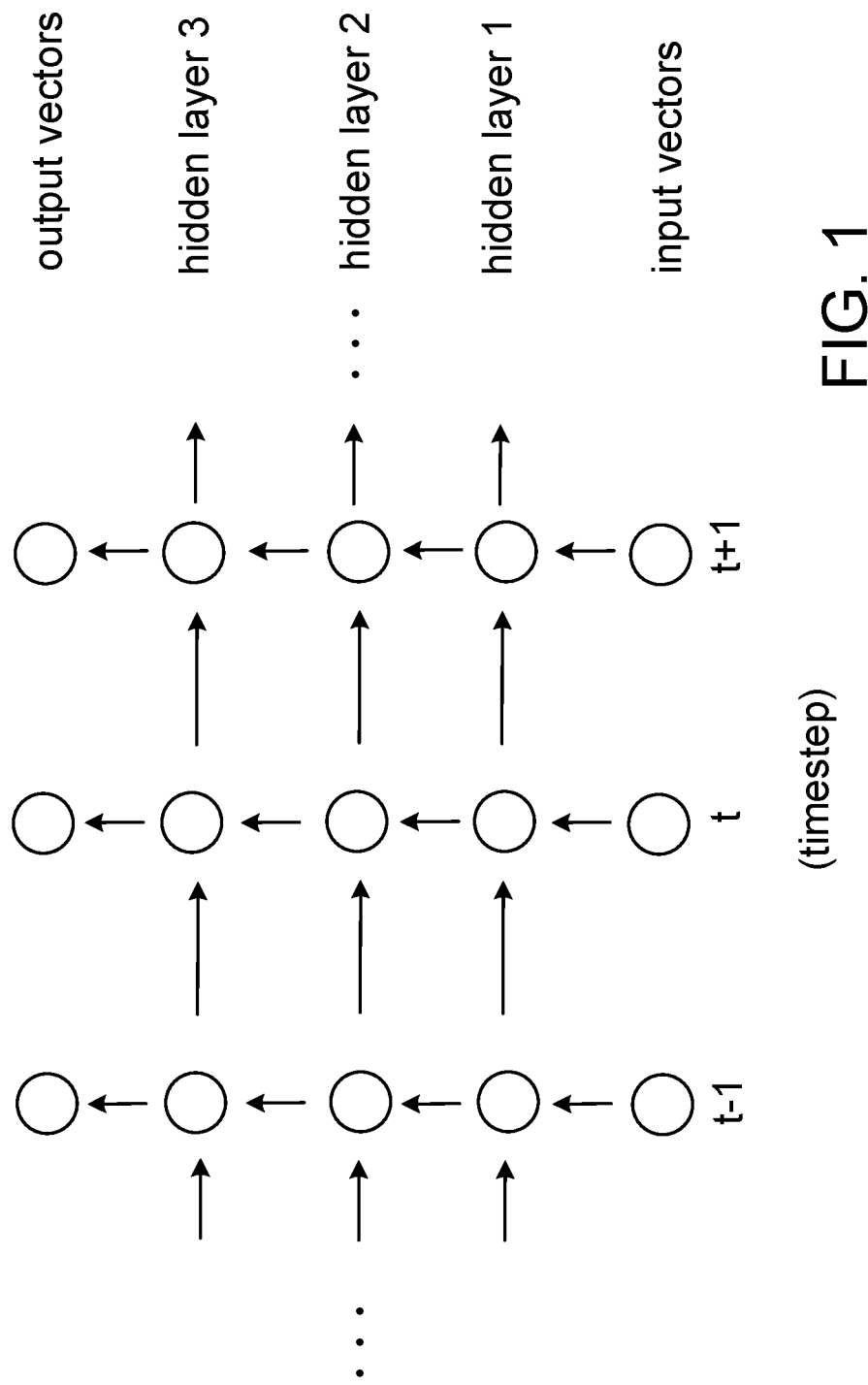
FIG. 1 is a deep recurrent neural network.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

RNNs are inherently deep in time, since their hidden state is a function of all previous hidden states. It has now been found that RNNs can also benefit from depth in space; that is from stacking multiple recurrent hidden layers on top of each other. In one aspect, such an RNN is provided, which is referred to herein as a "deep RNN".

In another aspect, each hidden layer of the deep RNN is implemented by a Long Short-term Memory (LSTM) RNN, providing a deep LSTM RNN. It has been found that a deep LSTM RNN configured in accordance with the following details can provide high performance in speech recognition.

In yet another aspect, hidden layers of the deep RNN are implemented by bidirectional RNNs (BRNNs) which compute both forward and backward hidden sequences, exploiting future context of a speech pattern.

In a further aspect, hidden layers of the deep RNN may be implemented by a combination of LSTM RNNs and BRNNs.

In yet another aspect, an end-to-end training module and method is provided which, in one implementation, is operable to jointly train RNNs as acoustic and language models.

Referring now to FIG. 1, a deep RNN is shown. As will be appreciated by a person of skill in the art, any layer, component of a layer, or multiple layers may be implemented by one or more processors. A memory may also be provided for storing activation functions, weights and network topology, including numbers and types of hidden layers, depths of layers, etc.

Given an input sequence $x=(x_1, \ldots, x_T)$, an exemplary recurrent neural network (RNN) may compute the hidden vector sequence h=(h$_1$, ..., h$_T$) by iterating the following equation from t=1 to T:

$$h_t = H(W_{xh}x_t + W_{hh}h_{t-1} + b_h) \quad (1)$$

where W$_{xh}$ is the input-hidden weight matrix, W$_{hh}$ is the hidden-hidden weight matrix, b$_h$ is the hidden bias vector and H is the hidden layer function.

Figure 2:
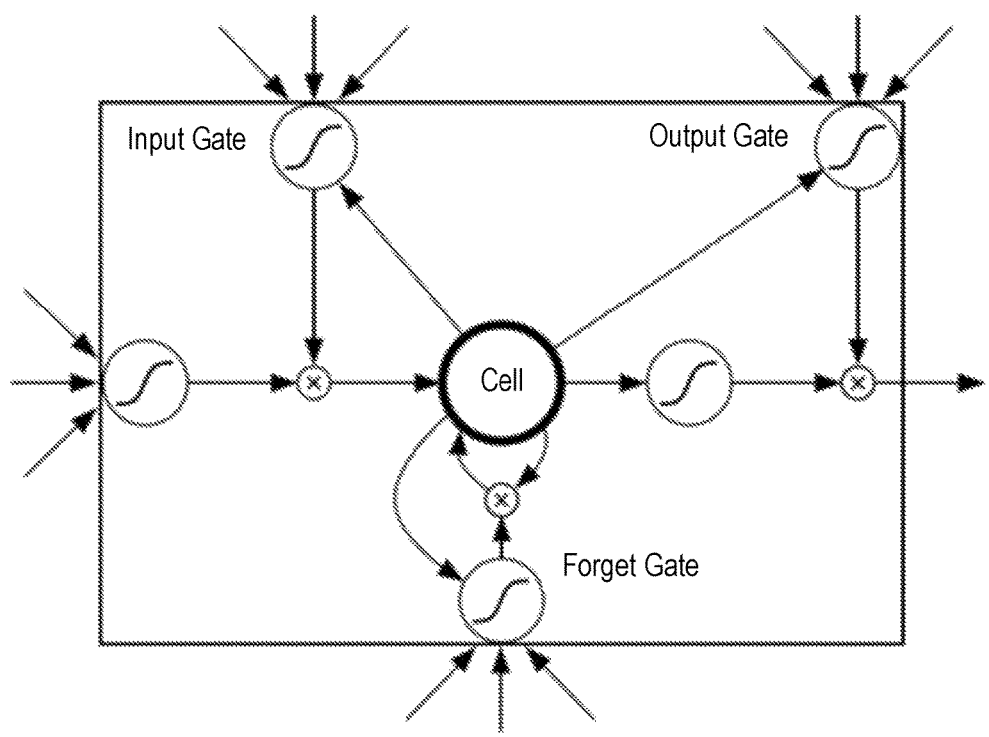
FIG. 2 is a memory cell of a long short-term memory recurrent neural network.

In one aspect, layers of the deep RNN may be provided by a LSTM RNN. In current RNNs, H is usually an elementwise application of a sigmoid function. However, it has been found that the deep LSTM RNN described herein, which uses purpose-built memory cells, as shown for example in FIG. 2, to store information, is operable to determine and exploit long range context. In an exemplary LSTM implemented herein, H may be implemented by the following composite function:

$$i_t = \sigma(W_{xi}x_t + W_{hi}h_{t-1} + W_{ci}c_{t-1} + b_i) \quad (2)$$

$$f_t = \sigma(W_{xf}x_t + W_{hf}h_{t-1} + W_{cf}c_{t-1} + b_f) \quad (3)$$

$$c_t = f_t c_{t-1} + i_t \tanh(W_{xc}x_t + W_{hc}h_{t-1} + b_c) \quad (4)$$

$$o_t = \sigma(W_{xo}x_t + W_{ho}h_{t-1} + W_{co}c_t + b_o) \quad (5)$$

$$h_t = o_t \tanh(c_t) \quad (6)$$

where i, f, o and c are respectively the input gate, forget gate, output gate and cell activation vectors, all of which are the same size as the hidden vector h. The weight matrices from the cell to gate vectors (e.g., W$_{si}$) may be diagonal, so element m in each gate vector may only receive input from element m of the cell vector.

Figure 3:
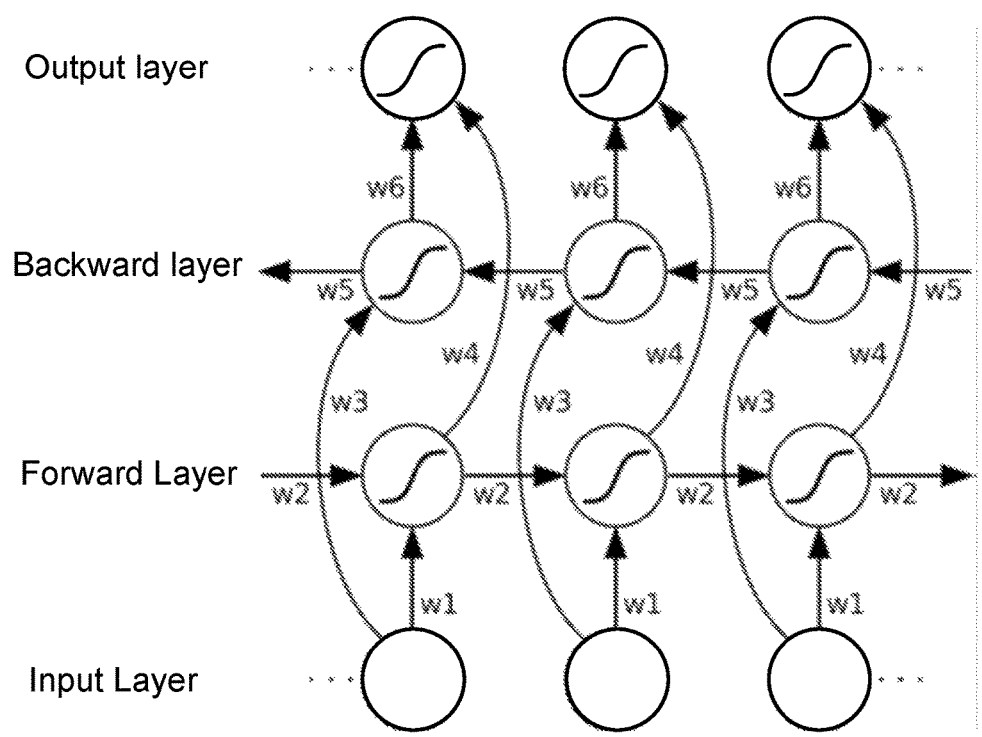
FIG. 3 is a bidirectional recurrent neural network.

In another aspect, as shown in FIG. 3, layers of the deep RNN may be provided by a BRNN. While conventional RNNs are only able to make use of previous context, it has been found that, in speech recognition where whole utterances are transcribed at once, it may be beneficial to consider future context as well. BRNNs process data in both directions with two separate hidden layers which are then fed forwards to the same output layer. A BRNN computes the forward hidden sequence $\overleftarrow{h} = (\overleftarrow{h}_1, \ldots, \overleftarrow{h}_T)$ and the backward hidden sequence $\overrightarrow{h} = (\overrightarrow{h}_1, \ldots, \overrightarrow{h}_T)$, by iterating the backward layer from t=T to 1 and the forward layer from t=1 to T, as follows:

$$\overleftarrow{h}_t = H(W_{x\overleftarrow{h}}i_t + W_{\overleftarrow{h}\overleftarrow{h}}\overleftarrow{h}_{t-1} + b_{\overleftarrow{h}}) \quad (7)$$

$$\overrightarrow{h}_t = H(W_{x\overrightarrow{h}}i_t + W_{\overrightarrow{h}\overrightarrow{h}}\overrightarrow{h}_{t+1} + b_{\overrightarrow{h}}) \quad (8)$$

In yet another aspect, combining BRNNs with LSTM gives bidirectional LSTM, which may further access long-range context in both input directions. Deep networks are operable to provide progressively higher level representations of acoustic data. An exemplary deep RNN may be provided by stacking multiple RNN hidden layers on top of each other, with the output sequence of one layer forming the input sequence for the next. Assuming the same hidden layer function is used for all N layers in the stack, the hidden vector sequences h$^n$ may be computed by iterating the following equation from n=1 to N and t=1 to T:

$$h_t^n = H(W_{h^{n-1}h^n}h_t^{n-1} + W_{h^nh^n}h_{t-1}^n + b_h^n) \quad (9)$$

Where h$^0$=x. Deep bidirectional RNNs can be implemented by replacing each hidden sequence h$^n$ with the forward and backward sequences $\overleftarrow{h}^n$ and $\overrightarrow{h}^n$, and ensuring that every hidden layer receives input from both the forward and backward layers at the level below. If LSTM is used for the hidden layers, the RNN is a deep bidirectional LSTM, which is the exemplary embodiment described in the remainder of the present disclosure.

The present deep RNN may be applied to phoneme recognition, where given an input vector sequence x of audio observations and a target sequence z of phoneme labels, the objective is to output a phoneme sequence y as similar as possible to z.

Figure 4:
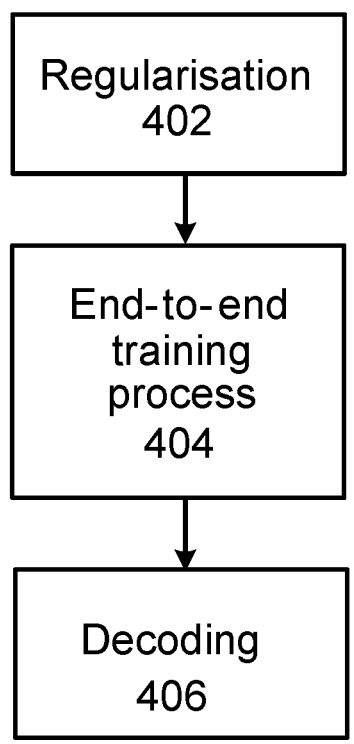
FIG. 4 is a training method for a deep recurrent neural network.

Referring now to FIG. 4, in one aspect a training method is provided. The training method may comprise regularisation (402), applying an end-to-end training process (404) and decoding (406). In an example, the end-to-end training process may be implemented using a learning set, such as the TIMIT corpus, for example. A resulting deep RNN may be configured to operate on input data, such as speech, for example.

An end-to-end training module implements the end-to-end training process. In various aspects, the end-to-end training module applies a connectionist temporal classification (CTC) and/or a sequence tranduction. In a specific embodiment, the end-to-end training module applies CTC for pretraining and retrains with a sequence transducer.

The training module trains the networks by using their activations to define a normalised, differentiable distribution Pr(y|x) over output sequences and optimising the network weights, for example by applying gradient descent, to maximise logPr(z|x). Training is, therefore, discriminative, which may be considered more suitable for speech recognition than generative training. It is also end-to-end, in the sense that no intermediate alignment or segmentation is required to define training targets; the network learns to map directly from input sequences to target sequences. The length of the input sequence is denoted as T, the length of the target sequence as U and the number of possible phonemes as K.

In one aspect, the end-to-end training system applies CTC, which is a method for sequence labelling applied to RNNs. CTC is described generally in A. Graves, S. Fernández, F. Gomez, and J. Schmidhuber, "Connectionist Temporal Classification: Labelling Unsegmented Sequence Data with Recurrent Neural Networks," in *Proceedings of the International Conference on Machine Learning*, ICML 2006, Pittsburgh, USA, 2006, which is incorporated herein by reference.

At every step t along the input sequence, CTC first applies a size K+1 softmax output layer to the network to define a normalised distribution Pr(k|t) over the K phonemes plus an extra blank symbol ∅ which represents a non-output. The network decides whether to emit any label, or no label, at every timestep. Taken together these decisions define a distribution over alignments between the input and target sequences. CTC next applies a forward-backward process to sum over all possible alignments and determine the normalised probability Pr(z|x) of the target sequence given the input sequence. Unlike some procedures that have been used in speech and handwriting recognition to 'integrate out' over possible segmentations, CTC dispenses with segmentations and instead sums over single-timestep label decisions. RNNs trained with CTC are generally bidirectional, to ensure that every Pr(k|t) is conditioned on the entire input sequence (and not just the inputs up to t). When applying CTC to a deep bidirectional LSTM network, Pr(k|t) may be defined as follows:

$$y_t = W_{\overleftarrow{h}y}\overleftarrow{h}_t^N + W_{\overrightarrow{h}y}\overrightarrow{h}_t^N + b_y \quad (10)$$

$$Pr(k|t) = \frac{\exp(y_t[k])}{\sum_{k'=1}^{K} \exp(y_t[k'])}, \tag{11}$$

where $y_t[k]$ is the $k^{th}$ element of the length K+1 unnormalised output vector $y_t$, and N is the number of bidirectional levels. CTC defines a distribution over output sequences that depends only on the input sequence. When applied to speech recognition it is therefore an acoustic-only model.

In another aspect, the end-to-end training system may apply a sequence transducer, an example of which is an RNN transducer, which implements an additional RNN to model the dependency of each output on the previous outputs, thereby yielding a jointly trained acoustic and language model. The RNN transducer is described generally in A. Graves, "Sequence transduction with recurrent neural networks," in *Representation Learning Workshop, International Conference on Machine Learning* (ICML 2012), 2012, which is incorporated herein by reference.

An RNN transducer may comprise two RNNs: a transcription network that models input-output dependencies (similar in approac to a CTC network); and a prediction network that models output-output dependencies by attempting to predict each output from the previous outputs. The transcription network (which may be implemented by a deep bidirectional LSTM as disclosed herein) accepts x as input and returns as output the length T transcription sequence $r=((\overleftarrow{h}_1^N, \overrightarrow{h}_1^N), \ldots, (\overleftarrow{h}_T^N, \overrightarrow{h}_T^N))$, which may be obtained by concatenating the hidden vectors of the uppermost bidirectional layers in the N level stack.

The prediction network is a unidirectional recurrent neural network, which may be implemented by a single-layer LSTM architecture, that takes as input a sequence of output labels with ∅ prepended (a 'blank' state before any outputs have been emitted). The labels may be encoded as one-hot vectors, with ∅ represented by vector of zeros; the input vectors are therefore size K if there are K possible phonemes. During training, when a length U target transcription z is provided, the input to the prediction network is the length U+1 vector sequence (∅,$z_1$, . . . , $z_U$) and the output is the length U+1 prediction sequence p of hidden vectors.

An RNN transducer applies the two networks to define a separate probability distribution Pr(k|t,u) over the output labels plus ∅ for every pair (t,u), where t is the number of steps along the input sequence, and u is the number of steps along the target sequence. As with CTC, these distributions jointly determine a distribution over all possible alignments between the input and target sequences, which can then be integrated out with a forward-backward algorithm to determine the total log probability of the target sequence.

In the original formulation Pr(k|t,u) was defined by calculating separate label distributions Pr(k|t) and Pr(k|u) for the two networks, then multiplying these together and renormalising. However, it has been found that the outputs of both networks may be provided as inputs to a separate feedforward neural network (which may be referred to as the output network), whose outputs may then be normalised with a softmax function to yield Pr(k|t,u). This may provide a richer set of possibilities for combining information from the two networks, which may lead to better generalisation. In particular, it has been found that the number of deletion errors encountered during decoding may be reduced. For example, the output network may be implemented by first feeding the transcription vector $r_t$ to a linear layer to generate the activation vector $l_t$, then feeding $l_t$ and $p_u$ to a tanh hidden layer to yield $h_{t,u}$, and finally feeding $h_{t,u}$ to a size K+1 softmax output layer to determine Pr(k|t,u):

$$l_t = W_{\overleftarrow{h}l} \overleftarrow{h}_t^N + W_{\overrightarrow{h}l} \overrightarrow{h}_t^N + b_l \tag{12}$$

$$h_{t,u} = \tanh(W_{lh}l_{t,u} + W_{pb}p_u + b_h) \tag{13}$$

$$y_{t,u} = W_{hy}h_{t,u} + b_y \tag{14}$$

$$Pr(k|t,u) = \frac{\exp(y_{t,u}[k])}{\sum_{k'=1}^{K} \exp(y_{t,u}[k'])}, \tag{15}$$

The non-output layers may be configured to be the same size (i.e., $|\overleftarrow{h}_t^n|=|\overrightarrow{h}_t^n|=|p_u|=|l_t|=|h_{t,u}|$); however they may alternatively be varied independently.

RNN transducers may be trained from random initial weights. However, alternatively, they may operate better when the transcription network is initialised with the weights of a pretrained CTC network, the prediction network is initialised with the weights of a pretrained next-step prediction network and only the output network starts from random weights. In a specific embodiment, the prediction network (the transducer's language model) may be pre-trained on the phonetic transcriptions of the audio training data; however for other applications it may be beneficial to pretrain on a separate (and much larger) text corpus.

Decoding of the RNN transducers may be provided by a beam search to yield an n-best list of candidate transcriptions. While CTC networks may be decoded using either a form of best-first decoding known as prefix search or by simply taking the most active output at every timestep, in one embodiment CTC networks may be decoded with the same beam search as the transducer, with the modification that the output label probabilities Pr(k|t,u) may not depend on the previous outputs (so Pr(k|t,u)=Pr(k|t)). Beam search may be both more efficient and more effective than prefix search for CTC. Normalisation may comprise sorting the n-best transcriptions by their length normalised log-probabilty logPr(y)/|y| or, preferably, by Pr(y).

Regularisation may also be beneficial for good performance with RNNs, because their modelling power may render them prone to overfitting. Regularisation may be provided by early stopping and weight noise (the addition of zero-mean, fixed variance Gaussian noise to the network weights during training), for example. Weight noise tends to 'simplify' neural networks, in the sense of reducing the amount of information required to transmit the parameters, which may improve generalisation.

In specific embodiments, the training method may comprise CTC, transducer or pretrained transducer (pretrained with CTC, for example). Furthermore, the number of bidirectional hidden levels may be configured to a suitable depth. Preferably, the depth is between 1 and 3 but further levels may be more beneficial. The number of LSTM cells in each hidden layer may also be varied. A suitable number may be approximately 250.

Training of networks may use stochastic gradient descent, with example configuration comprising a learning rate of $10^{-4}$, momentum of 0.9 and initial weights uniform on [−0.1,0.1]. All networks may be first trained with no noise and then, starting from the point of lowest log-loss on the development set, retrained with Gaussian weight noise (std. dev. 0.075, for example) until the point of lowest phoneme error rate on the development set. Alternatively, networks may be trained with noise initially. Beam search decoding may be used for all networks, with a beam width of 100, for example.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A system method for speech recognition, the method comprising:
   receiving a sequence of audio observations;
   processing the sequence of audio observations using a deep recurrent neural network ("deep RNN") implemented on one or more computers to generate a sequence of text symbols that represents the sequence of audio observations, the deep RNN being an RNN comprising an input layer, an output layer, and multiple recurrent hidden layers organized in a stack on top of each other;
   wherein the multiple recurrent hidden layers comprise:
      a lowest hidden layer configured to receive input vectors from the input layer, and
      a highest hidden layer configured to generate output vectors received as inputs by the output layer, wherein at least one of the multiple recurrent hidden layers is implemented by a Long Short-term Memory ("LSTM") RNN.

2. The a system method of claim 1, wherein:
   each hidden layer within the stack produces an output sequence of output vectors and receives an input sequence of input vectors; and
   the output sequence of each hidden layer within the stack other than the highest hidden layer is the input sequence of the next higher hidden layer in the stack.

3. The system method of claim 2, wherein the same hidden layer function is used for all of the multiple recurrent hidden layers in the deep RNN.

4. The method of claim 1, wherein:
   the multiple recurrent hidden layers comprise at least three hidden layers.

5. The system method of claim 1, wherein:
   the LSTM RNN computes a hidden vector sequence $h=(h_1, \ldots, h_T)$ for input vectors $x_t$ for $t=1$ to $T$ according to the following composite function:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tanh(W_{xc}x_t + W_{hc} + b_c)$$

$$o_t = \sigma(W_{xo}x_t + W_{ho}h_{t-1}W_{co}c_t + b_o)$$

$$h_t = o_t \tanh(c_t)$$

where $\sigma$ is a sigmoid function;
   where i, f, o, and c are respectively input gate, forget gate, output gate, and cell activation vectors, all of which are the same size as the hidden vector h; and
   where each W is a weight matrix and each b is a bias vector.

6. The method of claim 5, wherein each weight matrix W is diagonal.

7. The method of claim 1, wherein the output layer is a softmax output layer that is configured to receive an output vector and to generate a respective score for each text symbol in a set of text symbols and a score for a blank symbol that represents a non-output.

8. The method of claim 7, wherein each output in the sequence of text symbols is either a text symbol from the set of text symbols or the blank symbol that represents the non-output.

9. One or more non-transitory computer readable media storing instructions that when executed by one or more computers cause the one or more computers to perform operations comprising:
   receiving a sequence of audio observations; and
   processing the sequence of audio observations using a deep recurrent neural network ("deep RNN") implemented on one or more computers to generate a sequence of text symbols that represents the sequence of audio observations, the deep RNN being an RNN comprising an input layer, an output layer, and multiple recurrent hidden layers organized in a stack on top of each other;
   wherein the multiple recurrent hidden layers comprise:
      a lowest hidden layer configured to receive input vectors from the input layer, and
      a highest hidden layer configured to generate output vectors received as inputs by the output layer, wherein at least one of the multiple recurrent hidden layers is implemented by a Long Short-term Memory ("LSTM") RNN.

10. The computer readable media of claim 9, wherein:
    each hidden layer within the stack produces an output sequence of output vectors and receives an input sequence of input vectors; and
    the output sequence of each hidden layer within the stack other than the highest hidden layer is the input sequence of the next higher hidden layer in the stack.

11. The computer readable media of claim 10, wherein the same hidden layer function is used for all of the multiple recurrent hidden layers in the deep RNN.

12. The computer readable media of claim 9, wherein:
    the multiple recurrent hidden layers comprise at least three hidden layers.

13. The computer readable media of claim 9, wherein:
    the LSTM RNN computes a hidden vector sequence $h=(h_1, \ldots, h_T)$ for input vectors $x_t$ for $t=1$ to $T$ according to the following composite function:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tanh(W_{xc}x_t + W_{hc} + b_c)$$

$$o_t = \sigma(W_{xo}x_t + W_{ho}h_{t-1}W_{co}c_t + b_o)$$

$$h_t = o_t \tanh(c_t)$$

where $\sigma$ is a sigmoid function;
    where i, f, o, and c are respectively input gate, forget gate, output gate, and cell activation vectors, all of which are the same size as the hidden vector h; and
    where each W is a weight matrix and each b is a bias vector.

14. The computer readable media of claim 13, wherein each weight matrix W is diagonal.

15. The computer readable media of claim 9, wherein the output layer is a softmax output layer that is configured to receive an output vector and to generate a respective score for each text symbol in a set of text symbols and a score for a blank symbol that represents a non-output.

16. The computer readable media of claim 15, wherein each output in the sequence of text symbols is either a text symbol from the set of text symbols or the blank symbol that represents the non-output.

17. A system comprising one or more computers and one or more storage devices storing instructions that when executed by the one or more computers cause the one or more computers to perform operations comprising:
  receiving a sequence of audio observations; and
  processing the sequence of audio observations using a deep recurrent neural network ("deep RNN") implemented on one or more computers to generate a sequence of text symbols that represents the sequence of audio observations, the deep RNN being an RNN comprising an input layer, an output layer, and multiple recurrent hidden layers organized in a stack on top of each other;
  wherein the multiple recurrent hidden layers comprise:
    a lowest hidden layer configured to receive input vectors from the input layer, and
    a highest hidden layer configured to generate output vectors received as inputs by the output layer, wherein at least one of the multiple recurrent hidden layers is implemented by a Long Short-term Memory ("LSTM") RNN.

18. The system of claim 17, wherein:
  each hidden layer within the stack produces an output sequence of output vectors and receives an input sequence of input vectors; and
  the output sequence of each hidden layer within the stack other than the highest hidden layer is the input sequence of the next higher hidden layer in the stack.

19. The system of claim 18, wherein the same hidden layer function is used for all of the multiple recurrent hidden layers in the deep RNN.

20. The system of claim 17, wherein the output layer is a softmax output layer that is configured to receive an output vector and to generate a respective score for each text symbol in a set of text symbols and a score for a blank symbol that represents a non-output.

* * * * *